(12) United States Patent
Alappat et al.

(10) Patent No.: US 7,453,870 B2
(45) Date of Patent: Nov. 18, 2008

(54) BACKPLANE FOR SWITCH FABRIC

(75) Inventors: Kuriappan P. Alappat, Portland, OR (US); Brian Peebles, Cranford, NJ (US); Aniruddha Kundu, Portland, OR (US); Gerald Lebizay, Madison, NJ (US)

(73) Assignee: Intel Corporation, Santa Clara, CA (US)

( * ) Notice: Subject to any disclaimer, the term of this patent is extended or adjusted under 35 U.S.C. 154(b) by 1032 days.

(21) Appl. No.: 10/171,447

(22) Filed: Jun. 12, 2002

(65) Prior Publication Data

US 2003/0231624 A1 Dec. 18, 2003

(51) Int. Cl.
*H04L 12/50* (2006.01)
*H04Q 11/00* (2006.01)

(52) U.S. Cl. ..................... 370/360

(58) Field of Classification Search ......... 370/360–364, 370/406, 471, 432, 229, 310–321, 254, 442, 370/331, 227, 228, 353, 420–429, 386–399, 370/465, 536, 407, 354, 372, 369, 376, 413, 370/217, 218, 401, 222, 223, 380, 382, 419; 709/251, 250, 230, 238, 224, 223, 228, 237, 709/229, 235, 252, 225; 455/445, 423; 713/153; 398/58, 66, 51, 49, 43; 375/222; 710/104, 710/8, 52
See application file for complete search history.

(56) References Cited

U.S. PATENT DOCUMENTS

| 5,408,469 A * | 4/1995 | Opher et al. ................. 370/399 |
| 5,446,572 A * | 8/1995 | Husbands et al. ............. 398/89 |
| 6,396,832 B1 * | 5/2002 | Kranzler ..................... 370/360 |
| 6,597,689 B1 * | 7/2003 | Chiu et al. .................. 370/354 |
| 6,611,526 B1 * | 8/2003 | Chinnaswamy et al. ..... 370/406 |
| 6,693,901 B1 * | 2/2004 | Byers et al. ................. 370/362 |
| 6,853,680 B1 * | 2/2005 | Nikolich ..................... 375/222 |
| 7,151,741 B1 * | 12/2006 | Elliot et al. ................. 370/218 |
| 2003/0131228 A1 * | 7/2003 | Twomey ..................... 713/153 |
| 2003/0193937 A1 * | 10/2003 | Beshai et al. ................ 370/372 |
| 2003/0212830 A1 * | 11/2003 | Greenblat et al. ........... 709/251 |
| 2004/0032827 A1 * | 2/2004 | Hill et al. .................... 370/229 |
| 2004/0196838 A1 * | 10/2004 | Zadikian et al. ............. 370/360 |
| 2004/0233909 A1 * | 11/2004 | Allen et al. ............... 370/395.1 |
| 2004/0246977 A1 * | 12/2004 | Dove et al. ............. 370/395.61 |

OTHER PUBLICATIONS

Heckman, Melissa; Rajan, Ram;Switched fabrics optimize communications backplane: the appropriate topology, chassis design, and cooling management yield scalable high-performance systems, Electronic Design, Feb. 18, 2002, pp. 53-58.*
Cisco Products, Quick Reference Guide, Aug. 2000, Cisco, p. 152.*

* cited by examiner

*Primary Examiner*—Wing F. Chan
*Assistant Examiner*—Prenell P Jones
(74) *Attorney, Agent, or Firm*—Guojun Zhou

(57) ABSTRACT

A backplane employed in a switch fabric, having the capability to allow signal communication between at least two modules. Two or more of the modules being adapted to employ different topologies from the following types of topologies: star, dual star, mesh, and cascaded mesh.

18 Claims, 6 Drawing Sheets

US 7,453,870 B2

BACKPLANE FOR SWITCH FABRIC

BACKGROUND

This disclosure is related to a switch fabric topology, such as may be implemented on a packet switched backplane.

A switch fabric, e.g., arrangements or configurations of devices that, for example, handle, process, route, and/or transfer information, may typically interconnect or mutually couple network equipment, such as, for example, switches, servers, network appliances, local area networks (LANs) and/or wide area networks (WANs). Such switch fabrics may affect or control information flow within a network, such as between network equipment, located, for example, within reasonable proximity. Typically, such switch fabrics are implemented within a self-contained unit, such as a shelf or chassis, for example, with a backplane. The shelf may have slots or other compartments where one can plug-in or otherwise physically and electrically couple servers, switches, routers, telco line I/O cards, etc., of the network with the backplane.

When selecting a packet switched backplane topology for a switch fabric, there are several commonly used backplane topologies, although, of course, other configurations or topologies are also possible. These backplane topologies may include, for example, a star topology, a mesh topology and/or a cascaded mesh topology, illustrated, for example, in FIGS. 4, 5, and 6, respectively.

In a typical star topology, as illustrated in FIG. 4, the nodes of the network couple through a switch fabric to an active switch fabric device. If two switch fabric devices are employed, for redundancy typically, then the configuration is referred to as a dual star topology. FIG. 4 is a schematic diagram illustrating an embodiment of a dual star backplane topology for a network having 16 nodes. The switch fabric device or devices may control the transfer or redirection of signals through the switch fabric from at least one of the network nodes to at least another of the network nodes or to external equipments/networks through uplink ports or management ports.

In a mesh topology, in contrast, the network nodes are coupled to directly via the backplane. The nodes include a switching circuit so that a dedicated switch fabric device may be omitted. As the number of nodes increases, however, the complexity of the bus increases significantly. FIG. 5 is a schematic diagram illustrating a mesh backplane topology for a network having 17 nodes, for example.

With a cascaded mesh topology, the nodes of the network may be divided into subsets or smaller meshes, where the nodes of a subset are coupled directly through a backplane. One or more nodes in one subset may then be coupled to one or more nodes in a second subset via a switch fabric device or directly through the backplane. Thus, with this particular topology, an upper bound is present on the number of 'node hops' it takes to route signals between any two nodes in the network. Also this topology results in fewer interconnects.

Although, in general, these backplane topologies individually may have different advantages and disadvantages, typically, adjustments in the network configuration may make it desirable to have a previously selected backplane topology removed and replace it with another or different backplane topology. This, however, in many situations, may prove disadvantageous because it may increase cost, make the network unavailable for a time, and/or increase network complexity.

BRIEF DESCRIPTION OF THE DRAWINGS

The subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

Figure 1:
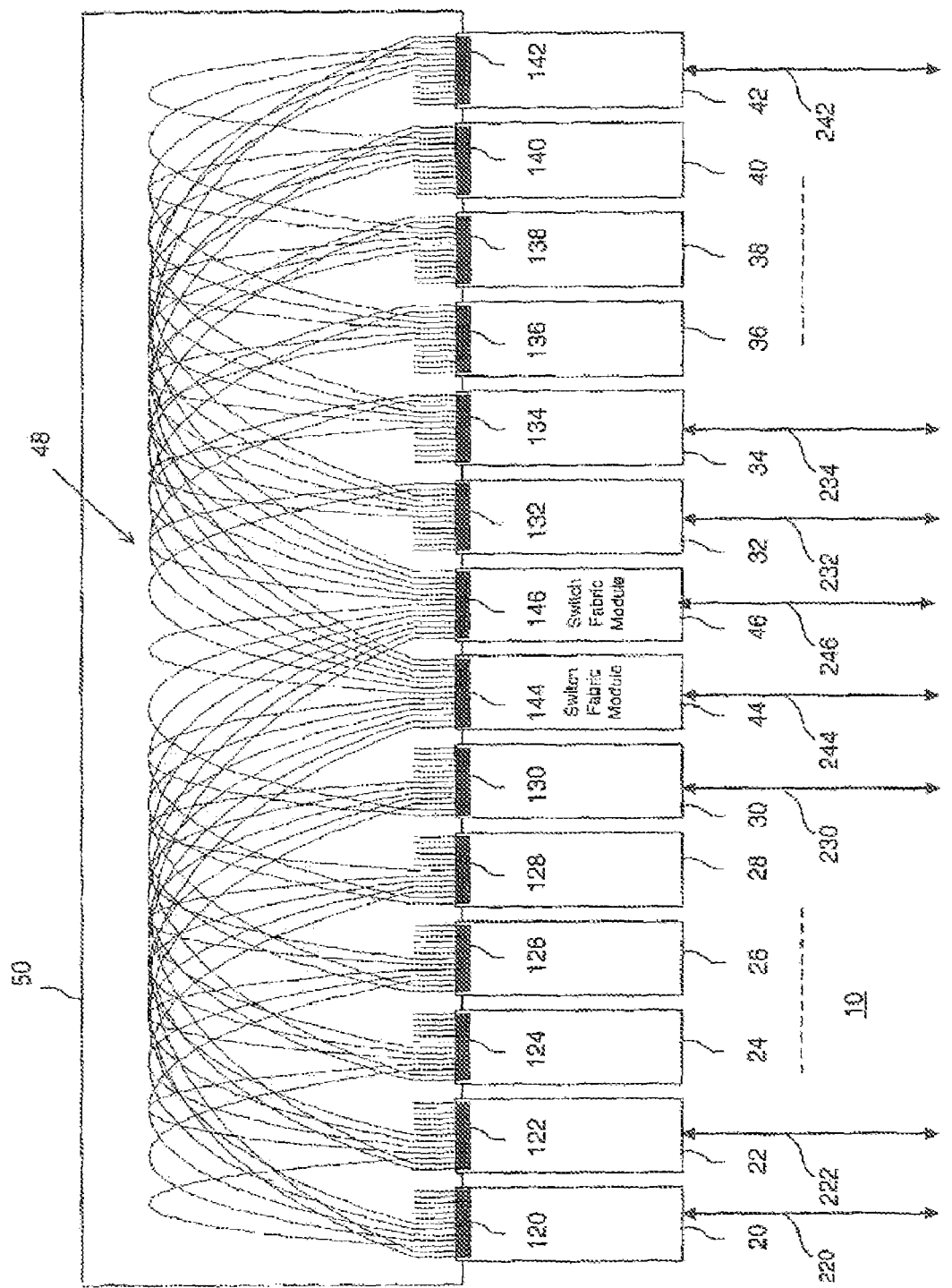
FIG. 1 is a schematic diagram illustrating one embodiment of a switch fabric or network switching fabric employing a backplane having a unified bus topology.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

Although switch fabrics may take any one of a number of forms, in one such form a switch fabric may include a card modular platform. A card modular platform typically comprises a backplane and multiple switch fabric modules and/or other types of boards, such as servers, routers, telco line cards, storage cards etc., contained within a single unit, such as a chassis or shelf, for example, that permits switching between a plurality of network nodes, thereby forming the switch fabric between the network nodes.

In one possible instantiation, the switch fabric module(s) and/or plug-in boards are coupled via a packet switched backplane which provides interconnect, such as, in this example, network interconnect, between slots or other compartments. A backplane typically is employed to provide power, management interface capability and/or network interface capability to the nodes of the network. It is noted that nodes of a network may, of course, take any one of a variety of forms and the subject matter of this disclosure is not intended to be limited in scope to any particular type of network node. Such nodes may include, for example, one or more devices that handle, store, display, output, route, switch and/or process information or signals, and may comprise, for example, without limitation, one or more computers or servers, telco line cards, storage units or boards, etc. Of course, the former are just examples and a node of a network may not necessarily take one of the forms previously enumerated and may still be included within the scope of the subject matter claimed. Likewise, a switch fabric module may include a device that is capable of transferring or switching signals received from one or more nodes to one or more nodes that may be different from the nodes that provided the signals to the switch fabric module. Example embodiments may comprise, for example, without limitation, a switch and/or a router.

In this particular embodiment, it is assumed that a packet switched network is employed, although it may be that other types of networks may be included within the scope of the claimed subject matter. The backplane may include circuitry capable of switching signals from one or more modules, such as switch fabric modules, to one or more other modules or to equipment external to the shelf. The modules may or may not comprise hot swappable modules, although typically hot swappable modules are employed for ease of operation and/or ease of replacement. Likewise, card modules may typically be in the form of plug-in or plugable modules that may couple or be coupleable to a backplane. The circuitry on the backplane typically is either passive or active. A passive backplane may include a bus, such as conductive or fiber traces, to route signals and/or power, for example. In some embodiments or instantiations, the backplane itself may also include a switch or switching device, e.g. a circuit or device that has the capability to alter the routing of signals based at least in part on characteristics of the signals, thereby making the backplane an active backplane. In contrast, if a switch fabric module that is a plug-in-unit is employed to provide routing, the backplane is not active. Plug-in node and fabric boards with a passive backplane may also enable swapping of defective boards. When there are redundant hot swappable boards, swapping may be accomplished without interruption to service. A passive backplane may hardwire the network nodes and/or switch fabric modules to each other without active components, thus potentially offering improved reliability and increased mean time between failures (MTBF) for the backplane. Plug-in node and fabric boards provide reduced mean time to repair (MTTR). Both high MTBF and low MTTR may increase availability of the equipment and hence the service. This improvement may occur, at least in part, because it may otherwise prove difficult to replace the backplane without shutting down an entire shelf forming a switch fabric in situations where an active backplane fails. A passive backplane, on the other hand, may have physical limitations regarding the size of the bus that couples the nodes together, thereby potentially limiting available bandwidth. Although the claimed subject matter is not limited in scope to either a passive or an active backplane, for the purposes of the remaining discussion, a passive backplane will be assumed.

Again, although the claimed subject matter is not limited in scope in this respect, FIG. 1 illustrates an embodiment 10 of a switch fabric including a first plurality of modules 20 to 30, a second plurality of modules 32 to 42, and switch fabric modules 44 and 46. In this particular embodiment, modules 20 to 30, modules 32 to 42 and switch fabric modules 44 and 46 are electrically and/or optically coupled through connectors 120 to 130, 132 to 142, and switching fabric connectors 144 to 146 respectively, via backplane 50. In this particular embodiment, backplane 50 includes topology 48, which provides the desired connections or coupling, as described in more detail hereinafter.

Modules 20 to 42 may transfer and receive signals, such as data and/or control signals, via connectors 120 to 142. Such signals may comprise, for example, data, address, and/or control signals or information, or any other signal information capable of being processed by nodes coupled to the network and/or switch fabric modules 44 and 46. Modules 20 to 42, for this particular embodiment, are discussed in more detail hereinafter. Likewise, switch fabric modules 44 and 46, for this particular embodiment, are discussed in more detail hereinafter. For this particular embodiment, a representative example of a network node that includes an active switching device, in this particular case a mesh node board with built-in switch to route traffic directly to other nodes, and a representative example of a switch fabric module, will be discussed, although, of course, the claimed subject matter is not limited to employing these particular representative examples. Furthermore, as previously indicated, many different forms or types of modules other than those specifically illustrated may be employed in a particular switch fabric and/or may be coupled to a particular backplane. Such other or different forms or types of modules, whether illustrated or not, are included within the scope of the claimed subject matter.

Modules 20 to 42 may also be coupled to a network via links 220 to 242. Switch fabric modules 44 and 46 may be coupled via links 244 and 246, respectively. Topology 48 may reside on backplane 50 and may be optically or electrically coupled with connectors 120 to 142, and connectors 144 and 146. Topology 48 is arranged to have the capability to direct signals from connectors 120 to 130 to switching fabric connectors 144 and/or 146, and to have the capability to route signals from switching fabric connectors 144 and/or 146 to connectors 132 to 142. Topology 48 may comprise any one of a number embodiments, such as a bus that routes signals between connectors 120 to 130 and/or between connectors 132 to 140. In such an embodiment, the bus may be in the form of a single trace or multiple traces, or an optical media that routes signals.

As previously described, an embodiment of a switch fabric may be included within a shelf or chassis and include a backplane, where the backplane is capable of being coupled to modules, for example, as previously described. At least some of the modules may comprise mesh, star or dual star modules and at least some of the modules may comprise switch fabric modules. In this particular embodiment, however, the backplane may further have or include a topology so that selected ones of the mesh modules are capable of being coupled in at least one self-contained mesh topology configuration and selected others of the mesh modules are capable of being coupled with one or more selected switch fabric modules in at least one self-contained star/dual star topology configuration. The backplane may further having a topology so that the at least one star topology configuration and the at least one mesh topology configuration are capable of interoperating, when the backplane is employed in a switch fabric.

Another potential embodiment may comprise a switch fabric having the capability to allow signal communication between at least two modules, at least two of the at least two modules respectively being adapted to employ different topologies from the following types of switching topologies: star, dual star, mesh, and cascaded mesh. In such an embodiment, this capability may be provided due, at least in part, to the topology of a backplane, which may provide a unified bus topology or configuration.

Likewise, one or more of the foregoing embodiments may operate in accordance with the following method, although, of course, the claimed subject matter is not limited to this particular method embodiment. Packet switched signals are forwarded through a switch fabric module, such as 44 or 46, for example, coupled to a backplane. The signals arrive from at least two modules, such as 20 to 42, for example, also coupled to the backplane. In this particular embodiment, two or more of the at least two modules are respectively adapted to employ different topologies from the following types of switching configurations or topologies: star, dual star, mesh, and cascaded mesh. Therefore, as previously discussed, these different configurations or topologies may be employed in a single self-contained unit, such as a chassis or shelf, for example, so that interoperation may occur.

Figure 2:
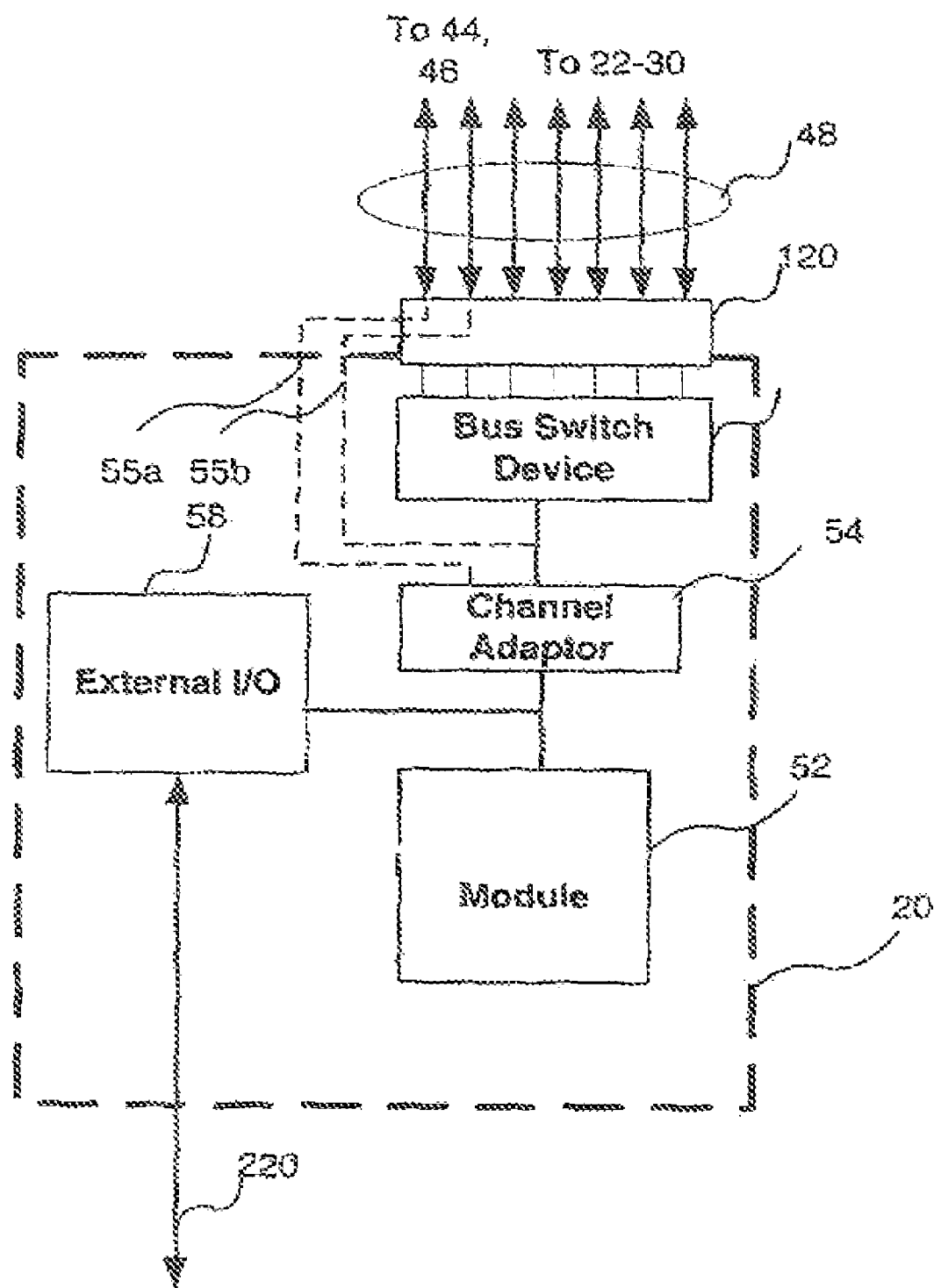
FIG. 2 is a schematic diagram illustrating one embodiment of a network node that includes an active switching device, in particular, here, a mesh node board with a built-in switch to route traffic directly to other nodes. Likewise, this diagram also illustrates an embodiment of a dual star node board with the switch and associated interconnects replaced by links 55a and 55b shown in dotted lines.

FIG. 2 illustrates an embodiment of a network node, here designated module 20, including a built-in switch. Module 20 includes a processor module 52 coupled via a channel adapter 54, e.g., a fabric interface chip (FIC) that converts a processor bus to a fabric link, such as in connection with well-known protocols, such as IEEE802.3, often referred to as Ethernet, or ANSI X3.230-1994, often referred to as Fibre Channel, for example. The channel adapter, here, is then connected or coupled to a built-in switch, such as switch 86, as in a mesh module, illustrated here, or it may be coupled to the switch fabric directly, as in the case of a star module. In a mesh module, as in this example, the bus switch device provides the capability to traffic signals between two nodes or, in this example, compartments of a single self-contained unit, such as a chassis, directly. As illustrated in FIG. 2, the mesh module is also coupled via external input/output (I/O) device 58 to network link 220. In operation, processor module 52 receives data from link 220 via external I/O device 58 and transfers the data through channel adapter 54 to bus switch device 86. Likewise, bus switch device 86 may be adapted to transfer signals received from nodes 22 to 30 and/or switch fabric modules 44 and/or 46 to channel adapter 54 and processor module 52, whereas bus switch device 86 and channel adaptor 54 may transfer the received signals to processor module 52. Likewise, bus switch device 86 may be coupled via a connector, here connector 120, to topology 48. Mesh module 20 thus transmits electrical and/or optical signals, such as data signals, via connector 120 to topology 48 and receives electrical or optical signals, such as data signals, via connector 120. Although the claimed subject matter is not limited in scope in this respect, FIG. 2 thus illustrates one embodiment of a network node that includes an active switching device, in particular, here, a mesh node board with built-in switch to route traffic to other nodes. Likewise, although electrical and/or optical signals are discussed herein by way of example, it is not intended that the claimed subject matter is necessarily limited thereto.

Alternatively, of course, module 20 may be configured as a star module, as alluded to above. When module 20 is configured as a star module, connector 120 may be coupled through topology 48 to switch fabric module 44 via link 55a and bus switch device is omitted. In a dual star module, one link goes to a switch fabric module, such as 44 and 46 over links 55a and 55b, for example, and may not be directly coupled to modules 22 to 30. Likewise, in another alternative embodiment, as also alluded to above, module 20 may be configured as a dual star module. In such an embodiment, a bus switch device is omitted. Channel adapter 54 may include dual output ports 55a and 55b (illustrated in FIG. 2 with hatched lines) coupled via connector 120 to switch fabric modules 44 and 46 respectively in a dual star topology, as previously described. Again, these are just example embodiments and the claimed subject matter is not limited in scope to these particular examples. Other module configurations may also be employed within the scope of the claimed subject matter.

As previously explained, module 20 is an example of a mesh module. At least in part because it includes a switch built-in, the information coming into the module from a port may be switched to another port. if the bus switch device is removed, however, and the dotted links 55a and 55b are coupled, as suggested above, this produces a dual star module. As previously explained, a star or a dual star module does not have a switch built-in. It employs, instead, a host control adapter. Therefore, switching traffic between ports is not generally possible. Rather, communication occurs between the processor and a port. As previously suggested, an advantage of an embodiment in accordance with the claimed subject matter, such as a switch fabric employing a unified backplane topology, for example, is that it allows both types of modules to co-exist and/or interoperate in a single self-contained unit, such as a shelf or chassis, for example.

Figure 3:
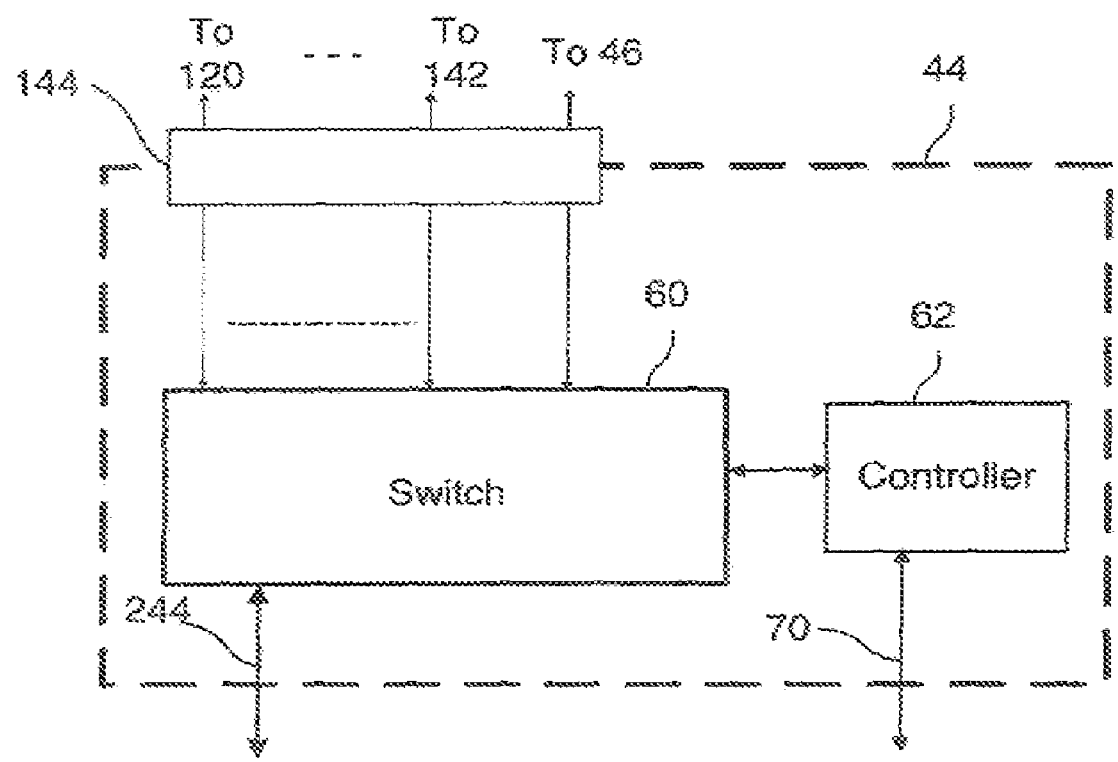
FIG. 3 is a schematic diagram illustrating one embodiment of a switch fabric module or circuit.
Figure 4:
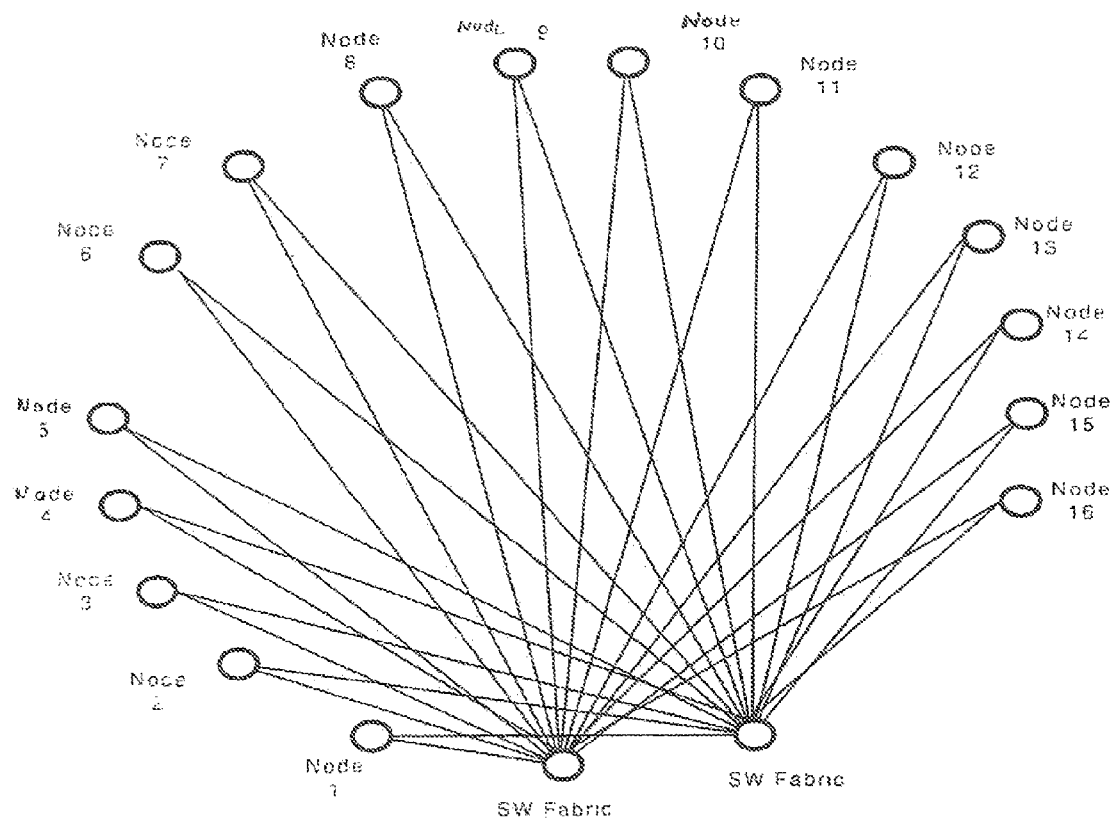
FIG. 4 is a schematic diagram illustrating one embodiment of a network employing a typical star backplane topology.
Figure 5:
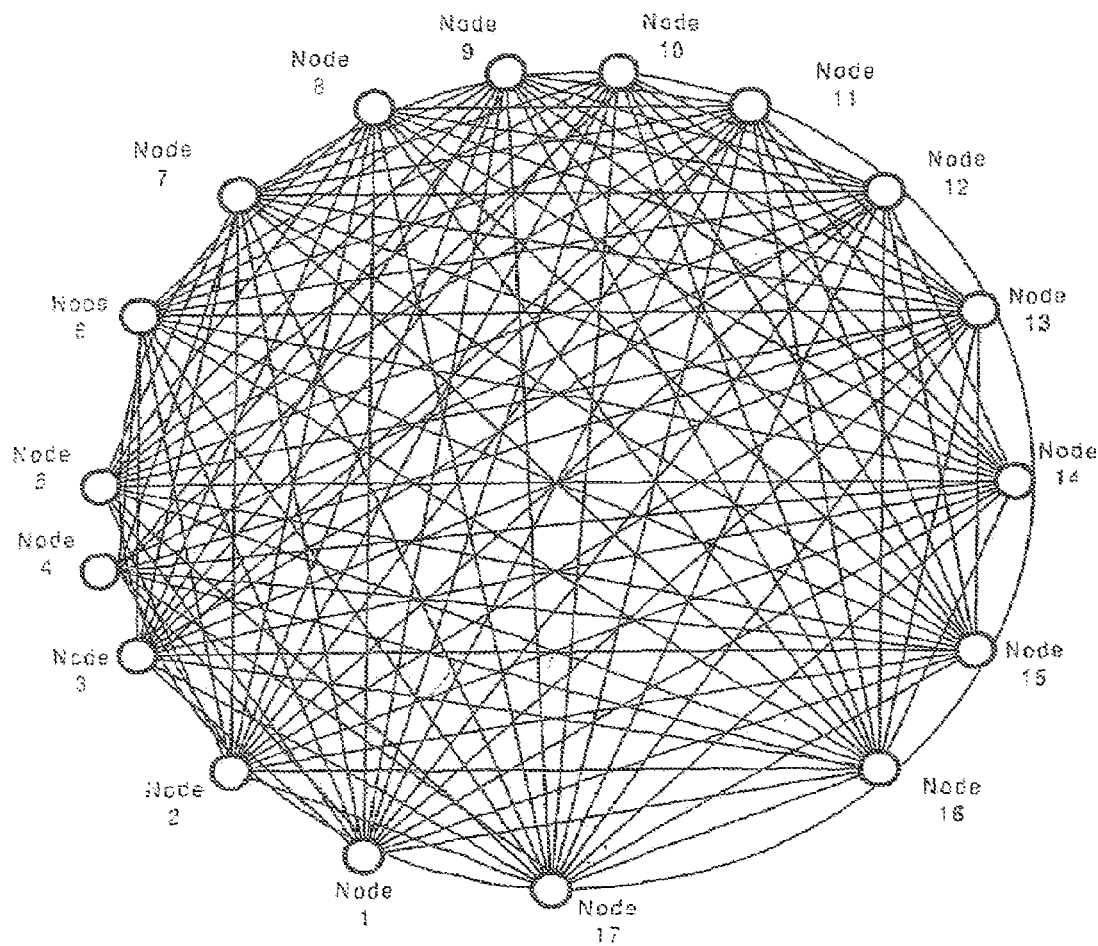
FIG. 5 is a schematic diagram illustrating one embodiment of a network employing a typical mesh backplane topology.
Figure 6:
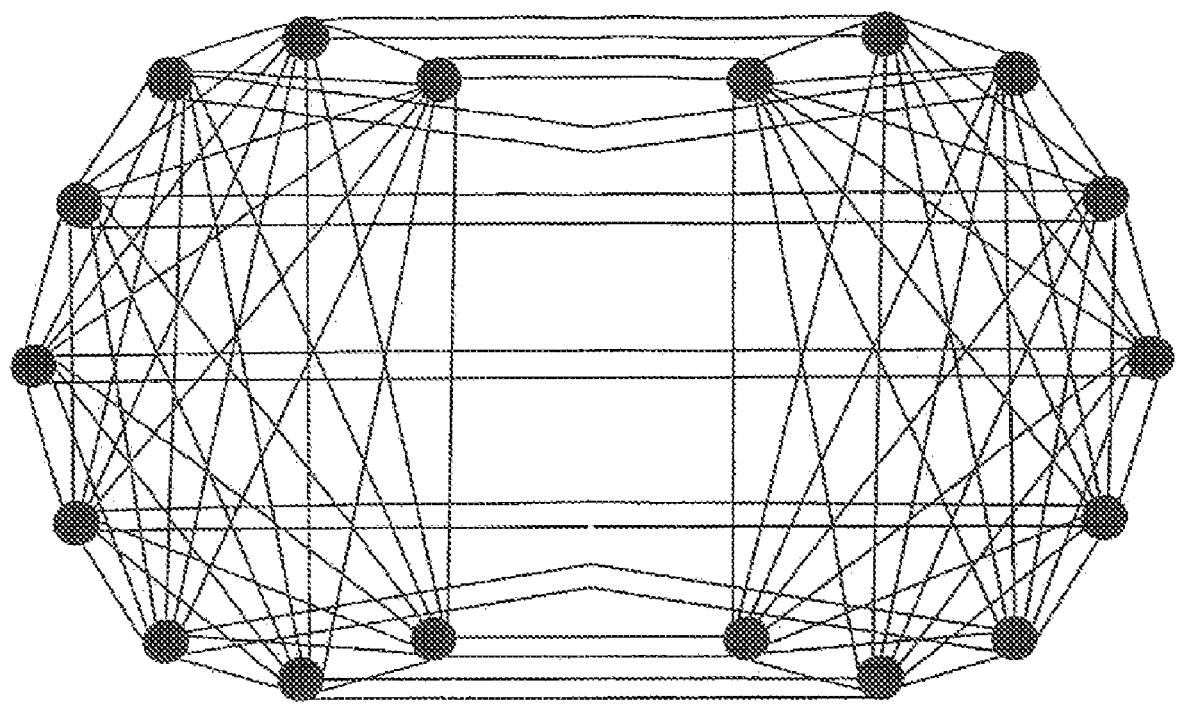
FIG. 6 is a schematic diagram illustrating one embodiment of a network employing a typical cascaded mesh backplane topology.

Although the claimed subject matter is not limited in scope in this respect, FIG. 3 illustrates one embodiment of a switch fabric module, such as 44. Switch fabric module 44 in this embodiment comprises switch circuit 60 and controller 62. Switch circuit 60 may be coupled via connector 144 and topology 48 to modules 20 to 42. Switch circuit 60 may comprise a device that routes, switches, processes, handles and/or transfers data or other information received from one or more modules, such as 20 to 42, for example, or from a switch fabric module, such as 46, to one or more other modules.

Although not specifically illustrated in FIG. 3, switch circuit 60 may also be coupled via expansion ports to other switch circuits, if desired. Controller 62 may be coupled to a management port 70. Controller 62 may comprise one or more devices such as, for example, a processor, memory, peripheral controller, or display controller, to control or otherwise direct the operation of switch 60. Controller 62 may receive control and/or other signal information from an external device via port 70 to be used in affecting the operation switch circuit 60. Likewise, switch circuit 60 may be adapted to route signals, in some instances, regardless of the content of the signals and/to examine the content of the signals and then route the signals to one or more of modules 20 to 42, based at least in part, on such signal content.

Switch circuit 60 may receive signals containing data or other information from topology 48 via connector 144 in this particular embodiment. Switch circuit 60 may be controlled or otherwise have its operation affected controller 62 to selectively route signals from one or more of modules, such as 20 to 42, or from switch fabric module 46, to one or more other modules. For example, although not limited to this illustrative example, switch circuit 60 may receive signals from module 20 and route the signals via connector 144 and topology 48 to module 42. In another example, switch circuit 60 may receive signals from module 20 and route the signals via connector 144 and topology 48 to switch fabric module 46. Switching may occur concurrently in a non-blocking switch implementation.

Although not limited hereto, switch fabric module 46 may comprise similar elements as described previously regarding switch fabric module 44. Switch fabric module 46 may provide redundancy for switch fabric module 44, for example. Likewise, in an alternative embodiment, switch fabric modules 44 and 46 may operate substantially concurrently to effectively double the bandwidth available for signal routing.

As previously described, an embodiment in accordance with the claimed subject matter may enable mesh and/or star modules and/or plug-in-boards to co-exist and interoperate within a self-contained unit, such as a shelf or chassis. Thus, the proposed backplane may enable utilization of the strengths or advantages of different topologies in a single unit. In a star topology, the switching intelligence is centralized and resides in the fabric modules. There is no direct communication between modules, resulting better isolation and security between applications executing on different modules. A disadvantage, however, compared to a mesh topology is that dedicated fabric modules taking up valuable slots.

In the preceding description, various aspects of the claimed subject matter have been described. For purposes of explanation, specific numbers, systems and configurations were set forth in order to provide a thorough understanding of the claimed subject matter. However, it is apparent to one skilled in the art having the benefit of this disclosure that the claimed subject matter might be practiced without the specific details. In other instances, well-known features were omitted or simplified in order not to obscure the claimed subject matter. While certain features have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. An apparatus comprising:
a backplane;
said backplane capable of being coupled to modules, at least some of said modules comprising mesh modules and at least some of said modules comprising switch fabric modules;
said backplane having a topology so that selected ones of said mesh modules are capable of being coupled in at least one self-contained mesh topology configuration;
said backplane further having a topology so that selected others of said mesh modules are capable of being coupled with one or more selected switch fabric modules in at least one self-contained star topology configuration;
said backplane further having a topology so that said at least one star topology configuration and said at least one mesh topology configuration are capable of interoperating.

2. The apparatus of claim 1, wherein said backplane is coupled to a plurality of modules to form a switch fabric, at least some of said modules comprising mesh modules and at least some of said modules comprising switch fabric modules.

3. The apparatus of claim 2, wherein selected ones of said mesh modules are coupled in at least one self-contained mesh topology configuration.

4. The apparatus of claim 3, wherein at least one of the selected ones of said mesh modules is also coupled in a self-contained star topology configuration.

5. The apparatus of claim 4, wherein said star topology configuration comprises a dual star topology configuration.

6. The apparatus of claim 3, wherein selected others of said mesh modules are coupled with one or more selected switch fabric modules in at least one self-contained star topology configuration.

7. The apparatus of claim 6, wherein said at least one star topology and said at least one mesh topology are contained within a single unit configuration.

8. The apparatus of claim 7, wherein said single unit configuration comprises a chassis.

9. The apparatus of claim 1, wherein said backplane comprises a passive, packet switched backplane.

10. The apparatus of claim 9, wherein said backplane is adapted to be employed in a switch fabric contained within a single chassis.

11. An apparatus comprising:
a passive, packet switched backplane;
said passive, packet switched backplane, at least when employed in a switch fabric, having the capability to allow signal communication between at least two modules, two or more of the modules to include a mesh module being adapted to employ one of a mesh topology and a cascaded mesh topology and a switch fabric module being adapted to employ one of a star topology and a dual-star topology;
wherein one mesh module is capable of being coupled with the switch fabric in at least one self-contained star topology configuration.

12. The apparatus of claim 11, wherein said passive, packet switched backplane is adapted to be employed in a switch fabric contained within a single chassis.

13. The apparatus of claim 11, wherein said passive, packet switched backplane is coupled in a switch fabric.

14. A switch fabric, comprising:
a passive, packet switched backplane;
a switch fabric module adapted to employ one of a star topology and dual star topology on said passive, packet switched backplane; and
a mesh module being adapted to employ one of a mesh topology and a cascaded mesh topology, said passive, packet switched backplane having the capability to allow signal communication between said mesh module and said switch fabric module, the mesh module capable of being coupled with the switch fabric module in at least one self-contained mesh topology configuration.

15. The switch fabric of claim 14, wherein said passive, packet switched backplane, said switch fabric module and said mesh module are contained within a single unit.

16. The switch fabric of claim 15, wherein said single unit comprises a chassis.

17. The switch fabric of claim 14, wherein said mesh module comprises a fabric interface chip having a capability to communicate traffic signals to an other mesh module and to said switch fabric module on said passive, packet switched backplane.

18. The switch fabric of claim 17, wherein said fabric interface chip is adapted to employ an Ethernet protocol to traffic signals to said other mesh module and said switch fabric module.

* * * * *